United States Patent [19]
Nygard

[11] Patent Number: 5,886,434
[45] Date of Patent: Mar. 23, 1999

[54] GENERATOR FIELD TURN COPPER

[75] Inventor: Robert John Nygard, Saratoga Springs, N.Y.

[73] Assignee: General Electric Co., Schenectady, N.Y.

[21] Appl. No.: 821,377

[22] Filed: Mar. 20, 1997

[51] Int. Cl.$^6$ .............................. H02K 3/00; H02K 1/20; H01B 7/34
[52] U.S. Cl. ........................ 310/61; 310/52; 310/60 R; 310/60 A; 310/2.01; 174/15.6; 174/16.2; 174/682
[58] Field of Search .................... 310/201, 58, 59, 310/61, 60, 60 R, 60 A, 180, 208; 174/15.6, 16.2, 68.2, 16.1

[56] References Cited

U.S. PATENT DOCUMENTS

| | | | |
|---|---|---|---|
| 2,755,395 | 7/1956 | Kilner | 310/59 |
| 3,119,033 | 1/1964 | Horsley et al. | 310/64 |
| 4,543,503 | 9/1985 | Kaminski et al. | 310/59 |
| 4,634,910 | 1/1987 | Schollhorn | 310/214 |
| 4,709,177 | 11/1987 | Kaminski | 310/59 |
| 5,329,197 | 7/1994 | Kudlacik | 310/198 |
| 5,468,907 | 11/1995 | Frankenhauser et al. | 175/15.6 |

*Primary Examiner*—Nestor Ramirez
*Assistant Examiner*—Tran N. Nguyen
*Attorney, Agent, or Firm*—Nixon & Vanderhye

[57] ABSTRACT

A generator coil comprising a plurality of stacked windings, each winding comprising a length of copper having a generally rectangular cross-sectional shape, and including an upper surface, a lower surface and a pair of side edges, wherein a groove is formed in the upper surface extending substantially the entire length of the winding.

11 Claims, 3 Drawing Sheets

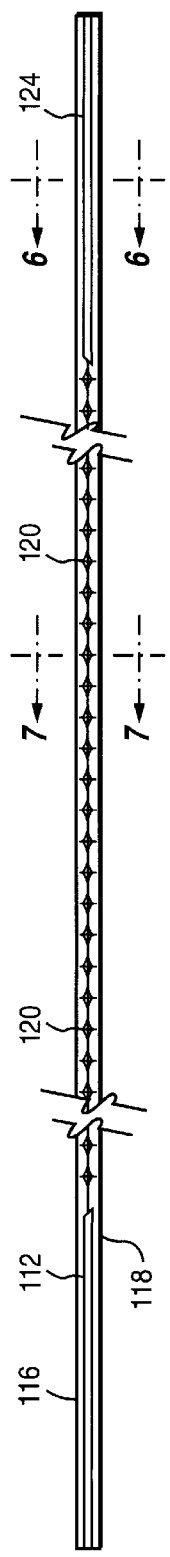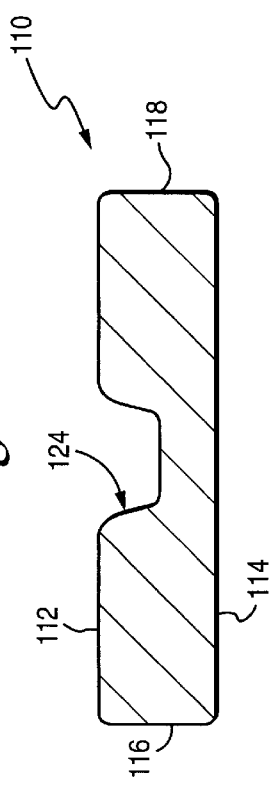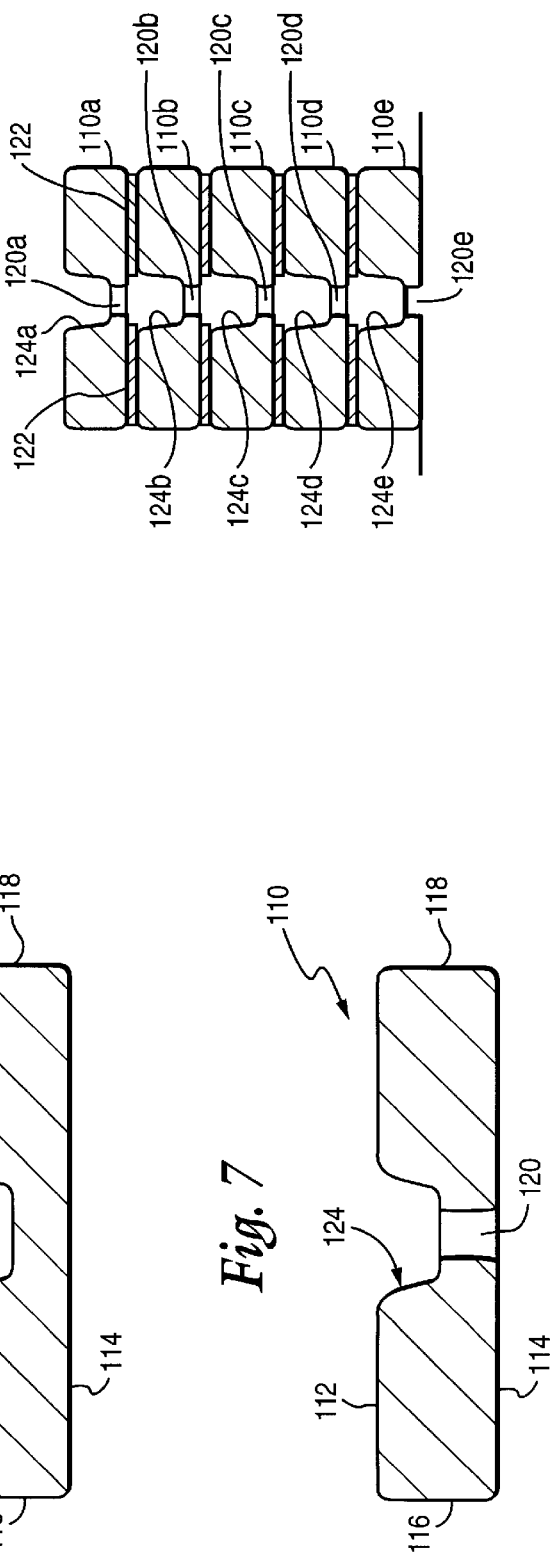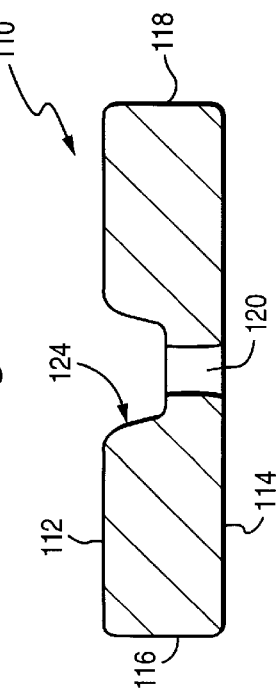

GENERATOR FIELD TURN COPPER

TECHNICAL FIELD

This invention relates generally to generator field windings and specifically, to a new extruded winding having a groove or slot running along the centerline of the winding.

BACKGROUND

Generator rotors are provided with radial slots about the periphery thereof, for receiving field or rotor windings of coils made up of a number of turns in a radially stacked arrangement, each turn or winding separated by insulation. The windings are retained in the slots by full-length wedges, with creepage blocks interposed between the wedges and the windings.

The generators currently available from the assignee are placed in three major design classifications based on the cooling medium used: air, hydrogen and liquid cooled. All hydrogen-water cooled generators use direct conductor cooling of the rotor winding for heat removal. Smaller two-pole and all four-pole generators use the radial flow design where hydrogen enters the windings through full length sub-slots and is discharged along the length of the rotor body through radial slots, machined or punched in the copper windings. The hydrogen passes from the conductors through the creepage blocks and wedges to the "air gap" between the rotor and the stator, where it is directed through the stator core to the hydrogen coolers.

At higher generator ratings, and consequently rotor body lengths, a gap-pickup diagonal-flow cooling process is employed. In this scheme, cold hydrogen is scooped up in the air gap between the rotor and stator and driven diagonally inwardly through the rotor field turns to directly remove the heat. At the bottom of the slot, the gas is turned and passes diagonally outwardly through the field turns to the air gap in the discharge stator core section. The stator core ventilation is coordinated with the rotor cooling gas flow, thus creating an in and out flow of hydrogen through the stator core, through the rotor and returning to the hydrogen cooler through the core.

The generator field windings consist of extruded copper that is drawn at a copper mill and then machined and fabricated into a usable coil. Within the last few years, these coils have been redesigned from square corner fabricated coils, to a "C" coil. The cross section of the copper to make these coils has essentially remained the same. The "C" coil has nevertheless been preferred because many benefits have been derived from that shape relating to cost, cycle time and quality. Nevertheless, in order to maintain a competitive stance in the marketplace, new copper designs are constantly being evaluated for increased performance. With the constant design changes, the cross sectional area of the copper has been increasing. When the thickness increases, the radial air cooling ducts that are machined in by a punch operation become increasingly more difficult to produce. For example, conventional punch operations may produce an unacceptable bulge in the width dimension of the copper, and it is therefore necessary to create a ventilation scheme for the increasing cross sections of the copper windings without unacceptable bulge in the width dimension.

It has also been attempted to improve the field winding ventilation or cooling by punching or forging turbulators within the radial cooling ducts. This approach, however, adds a second manufacturing operation and may, in fact, add to the bulge problem.

DISCLOSURE OF THE INVENTION

The principal object of this invention is to improve field winding copper and specifically, the cooling scheme for field rotor copper without jeopardizing the electrical requirements. To this end, the present invention relates to field winding copper extrusion geometry which includes a groove or slot along the centerline of the winding, which is also the centerline for the punched slots or holes. This groove or slot significantly reduces the thickness of the copper in the machining area to as little as 30% of the base material. Thus, not only is the ability to punch the copper made considerably easier, but other machining methods may now be utilized as well, such as conventional milling and water jet cutting.

In the preferred arrangement, the groove or slot in the field winding (or turn) copper has a generally V-shaped configuration, but with a substantially flat bottom, i.e., an inverted truncated V-shape. The groove extends over the substantially entire length of the field winding or turn and thus also significantly increases the surface area exposed to coolant gas pumped through the field.

With the present invention, a radial flow of air may be pumped from the radially inner turns to the radially outer turns as in conventional direct radial cooling. If one of the vent slots is restricted for any reason, however, such as misalignment of copper or insulation, or a foreign object, the entire stack of ventilated slots would normally be coolant starved. However, with the present arrangement, where an axial groove extends along the entire axial centerline of each field windings, one plugged radial vent slot does not jeopardize the cooling path. In fact, the horizontal groove may even increase the cooling effect by forcing the cooling gas axially.

In addition, because of the axially extending groove extending along the entire length of the field winding copper, insulation that is normally placed between adjacent windings and punched along with the coolant holes, may now be significantly reduced by utilizing smaller dimension strips running along opposite sides of the groove or slot. Thus, axial alignment of insulation to the coolant holes is not required. Moreover, insulation may now be provided in standard width rolls, eliminating the hole punch process and as much as 25% of the cross section of the insulation itself. The elimination of the center 25% of the insulation, of course, exposes additional copper to coolant gas and thus, enhances heat transfer.

Accordingly, in its broader aspects, the present invention relates to a generator coil comprising a plurality of stacked windings, each winding comprising a length of copper having a rectangular cross-sectional shape, and including an upper surface, a lower surface and a pair of side edges, wherein a groove is formed in the upper surface extending substantially the entire length of the winding.

Other objects and advantages of the subject invention will become apparent from the detailed description which follows.

BRIEF DESCRIPTION OF THE DRAWINGS

FIG. 5 is a partial top plan view of a field winding in accordance with this invention;

FIG. 6 is a cross section taken through the line 6—6 of FIG. 5;

FIG. 7 is a cross section taken through the line 7—7 of FIG. 5;

FIG. 8 is a cross section through one side of a coil including a stack of field winding copper in accordance with the invention.

BEST MODE FOR CARRYING OUT THE INVENTION

Figure 1:
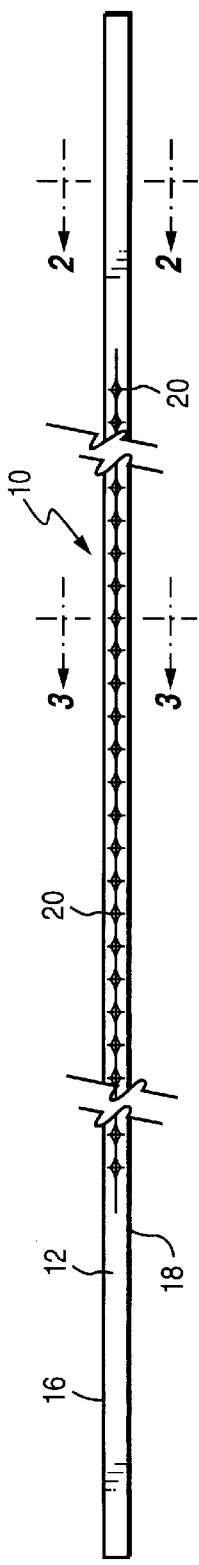
FIG. 1 is a partial top plan view of a strip of field winding of conventional construction.
Figure 2:
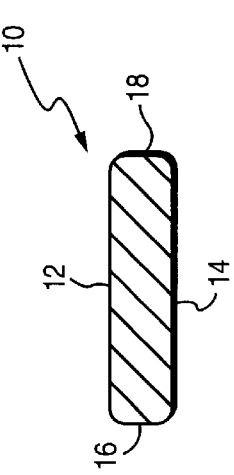
FIG. 2 is a cross section taken through line 2—2 of FIG. 1.
Figure 3:
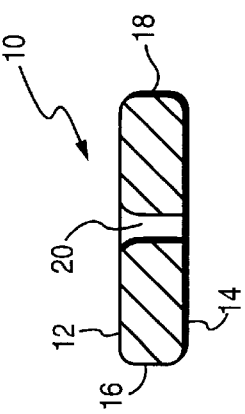
FIG. 3 is a cross section taken through line 3—3 of FIG. 1.
Figure 4:
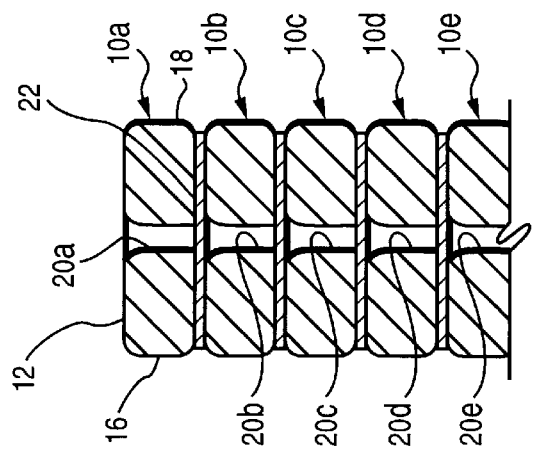
FIG. 4 is a cross section through one side of a coil, including a stack of field windings of the type illustrated in FIGS. 1–3.

FIGS. 1–3 illustrate a conventional field winding copper construction wherein the extruded copper has a substantially rectangular cross-sectional shape, including an upper side 12, a lower side 14 and opposite side edges 16 and 18. The extruded copper is then subjected to a punching process in order to provide a plurality of axially spaced holes 20 along the length of the copper. When a plurality of such field windings are stacked as shown in FIG. 4 at 10a, 10b, 10c, 10d and 10e, the aligned holes 20a, 20b, 20c, 20d and 20e, respectively, form a direct radial coolant passage which, in a typical generator configuration, extends from an inner axially extending sub-slot, to the air gap between the rotor and the stator. Individual windings are separated by strips of insulation 22. As can be seen in FIG. 1, many such radial ducts are provided along the length of the field winding copper and, for example, can be spaced as little as two inches apart.

Turning now to FIGS. 5–8, field winding copper in accordance with a preferred embodiment of this invention is illustrated. The copper 110 is extruded in the shape illustrated in FIG. 6, again having a substantially rectangular cross-sectional shape with an upper surface 112, a lower surface 114, and opposite side edges 116 and 118. A substantially truncated V-shaped groove 124 is formed along the axial centerline of the winding, opening to the upper surface 112 and extending to a maximum depth of about 70% of the thickness of the strip. This means that approximately only 30% of the original thickness (the thickness may be about 0.275 inch, and the depth of the groove or slot may be about 0.150 inch) remains to be punched in the coolant passage forming process. Thus, the amount of material which must be accommodated during the hole punching process is significantly reduced. In this regard, FIG. 7 illustrates the hole 120 punched in the strip 110 from the bottom of the groove or slot 124. With reference to FIG. 5, it may be appreciated that the axial groove or slot 124 extends the entire length of the field winding copper, and the holes 120 punched within the strip are axially spaced along the groove 124 and are otherwise configured substantially as holes 20 in the conventional arrangement shown in FIG. 1.

FIG. 8 illustrates a stack of field windings in accordance with the invention, where the radial coolant passage is formed by alternating grooves slots 124a, b, c, d and e and punched holes 120a, b, c, d and e as shown in that Figure. While the individual coolant openings are shown in alignment, there may be instances where a degree of misalignment is beneficial. Separate insulation strips 122 run along and between the windings, on either side of the grooves or slots 124a–e.

Figure 9:
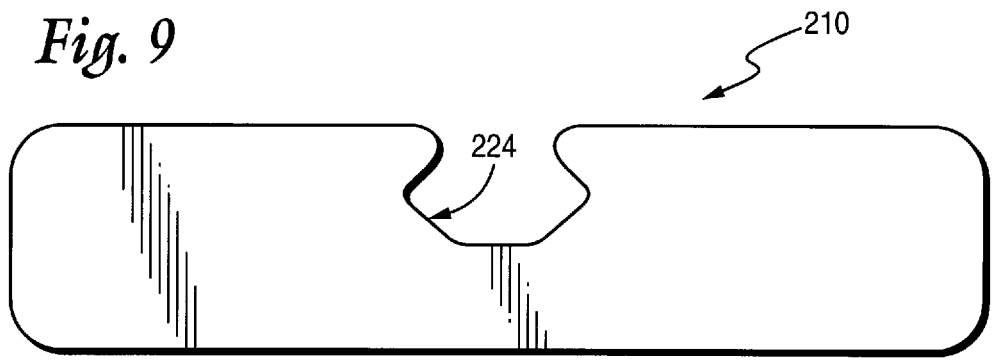
FIGS. 9–11 are sectioned views illustrating alternative groove configurations for field winding copper in accordance with alternative embodiments of the invention.
Figure 10:
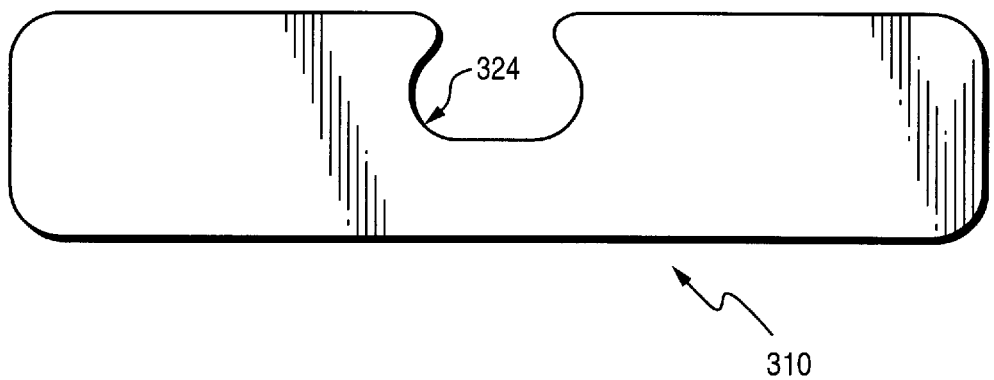
Figure 11:
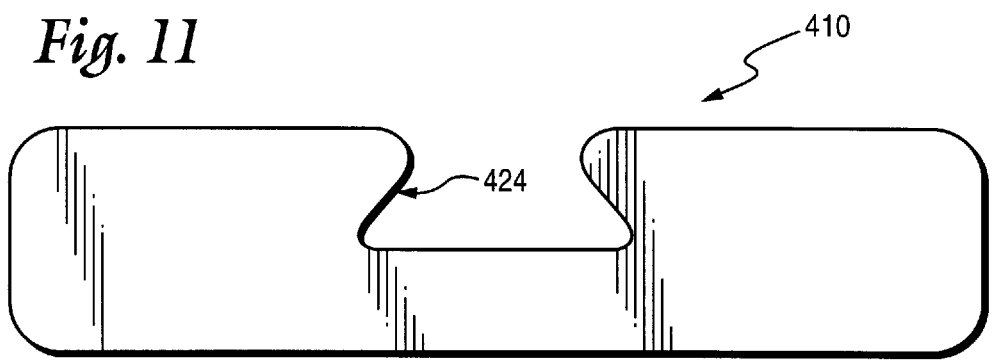

While the slot or groove cross section illustrated in FIG. 6 is preferred, other slot configurations may be utilized and, in this connection, FIGS. 9, 10 and 11 show alternative slot or groove cross sectional shapes which may be appropriate. Thus, in FIG. 9, the field winding copper 210 is provided with an axial groove 224 along the centerline thereof, with the side walls of the groove having a double angled arrangement. In FIG. 10, the field winding copper 310 is provided with a rounded axial groove 324. In FIG. 11, the field winding strip 410 is provided with an axial groove 424 having a substantially dovetail shape.

In each case, the presence of an axial centerline groove in the filed winding copper permits enhanced heat transfer or cooling capability while at the same time, permitting various design changes including increased cross sections for the copper, but without experiencing the unacceptable bulge in width dimension described hereinabove.

In addition, the groove concepts described above may have applicability in diagonal flow machines as well. By extending multiple grooves and strategically adding axial dams, diagonal flow designs could be greatly simplified and at reduced cost.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A generator coil comprising a plurality of stacked rotor windings, each winding comprising an axial length of copper having a generally rectangular cross-sectional shape, and including an upper surface, a lower surface and a pair of side edges, wherein an axial groove is formed in said upper surface extending substantially the entire length of the winding, said groove having a depth greater than 50% of the thickness of the winding, and including a plurality of coolant holes axially spaced along said groove, located within and extending through a bottom wall of said groove.

2. The generator coil of claim 1 wherein said groove has a depth of about 70% of the thickness dimension of the winding.

3. The generator coil of claim 1 wherein said groove has a substantially truncated V-shape in cross section including tapered side walls and a bottom wall.

4. The generator coil of claim 1 wherein said groove includes two side walls and a bottom wall, each side wall having a pair of angled components in a sideways V-shape.

5. The generator coil of claim 1 wherein said groove has rounded side walls and a bottom wall.

6. The generator coil of claim 1 wherein said groove is substantially dovetail shaped in cross-section.

7. The generator coil of claim 1 wherein coolant holes in adjacent windings are substantially aligned.

8. The generator coil of claim 3 and including a plurality of coolant holes axially spaced along said groove.

9. The generator coil of claim 8 wherein coolant holes in adjacent windings are substantially aligned.

10. The generator coil of claim 1 wherein insulating strips are inserted between each adjacent pair of windings.

11. The generator coil of claim 10 wherein, for each adjacent pair of windings, two discrete insulating strips are located on opposite sides of the grooves.

* * * * *